United States Patent [19]

Mehta et al.

[11] Patent Number: 5,601,930
[45] Date of Patent: Feb. 11, 1997

[54] DECOR SHEET AND DECORATIVE LAMINATES PREPARED THEREFROM

[75] Inventors: Mahendra Mehta, Pittsfield, Mass.; Larry O. Hill, Frankfort, Ohio

[73] Assignee: The Mead Corporation, Dayton, Ohio

[21] Appl. No.: 388,718

[22] Filed: Feb. 15, 1995

Related U.S. Application Data

[63] Continuation-in-part of Ser. No. 227,025, Apr. 13, 1994, abandoned.

[51] Int. Cl.$^6$ .............................. B32B 21/14; B32B 29/00
[52] U.S. Cl. ..................... 428/535; 428/533; 428/534; 428/526; 428/498; 428/322.2
[58] Field of Search ................... 428/533, 534, 428/535, 498, 322.2, 526, 530, 15, 106, 342

[56] References Cited

U.S. PATENT DOCUMENTS

| | | | |
|---|---|---|---|
| Re. 30,233 | 3/1980 | Lane et al. | 428/207 |
| 3,102,064 | 8/1963 | Wurzburg et al. | 162/158 |
| 3,946,137 | 3/1976 | Power et al. | 428/452 |
| 4,263,373 | 4/1981 | McCaskey, Jr. et al. | 428/531 |
| 4,267,240 | 5/1981 | Jaisle et al. | 428/484 |
| 4,337,290 | 6/1982 | Kelly et al. | 428/201 |
| 4,454,199 | 6/1984 | Berbeco | 428/322 |
| 4,505,974 | 3/1985 | Hosler | 428/329 |
| 4,543,290 | 9/1985 | Brooker et al. | 428/336 |
| 4,865,807 | 9/1989 | Petershofer et al. | 428/161 |
| 4,888,220 | 12/1989 | Mehta | 428/15 |
| 5,141,799 | 8/1992 | Mehta et al. | 428/207 |
| 5,213,883 | 5/1993 | Mehta | 428/224 |
| 5,268,204 | 12/1993 | Hill et al. | 427/923 |
| 5,411,637 | 5/1995 | Glomb et al. | 162/135 |
| 5,433,826 | 7/1995 | Glomb et al. | 162/135 |

FOREIGN PATENT DOCUMENTS 990632  11/1971  Canada .

*Primary Examiner*—Daniel Zirker
*Attorney, Agent, or Firm*—Thompson Hine & Flory LLP

[57] ABSTRACT

A decor sheet for use in decorative laminates wherein the sheet is treated with a sizing agent to reduce its capacity for a laminating resin and enhance its opacity; in a preferred embodiment, the resin-impregnated decor sheet exhibits a resin gradient in the thickness direction to provide a decor sheet having a resin-rich top layer and a resin-starved bottom layer; in accordance with a preferred embodiment, the resin gradient is achieved by differentially sizing the bottom versus the top surface of the decor sheet; a decorative laminate employing such decor sheets are described.

19 Claims, No Drawings

DECOR SHEET AND DECORATIVE LAMINATES PREPARED THEREFROM

CROSS-REFERENCE TO RELATED APPLICATION

This application is a continuation-in-part of U.S. application Ser. No. 08/227,025 filed Apr. 13, 1994 now abandoned.

FIELD OF THE INVENTION

The invention relates to manufacturing of decor sheets having high opacity and reduced resin uptake, and more particularly to decor laminates having high opacity as well as high gloss and surface durability.

BACKGROUND OF THE INVENTION

Decorative laminates are widely employed in the building industry for use as counter tops, kitchen and bathroom work surfaces, wall panelings, floors, cabinets, partitions and doors. Because they are generally more durable than wood and provide an attractive appearance, decorative laminates are also popular in the furniture industry, primarily as tops for furniture such as tables and desks.

The extensive use of these decorative laminates is primarily due to their low cost, impact and abrasion resistance, durability, clarity, and their resistance to heat, ultraviolet light and mild chemicals.

Decorative laminates are conventionally made from a core or body comprising a plurality of sheets of a fibrous material such as unbleached kraft paper which can be impregnated with a thermosetting resin. A decorative sheet also known as a decor sheet can be mounted on top of the core to hide or disguise the underlying core. The decor sheet typically comprises a fibrous sheet having either a design printed on it or it may have pigments dispersed therethrough to provide a solid color decor sheet. The decor sheet is generally made of high quality cellulosic fiber impregnated with a thermosetting condensation resin such as melamine-formaldehyde resin. Another sheet known as an overlay is commonly used as a protective covering for the decor sheet. Examples of such overlays are described in U.S. Pat. No. 4,505,974 and Canadian Patent No. 990,632.

Typically the decor sheet is a single layer sheet which exhibits good hiding power, surface durability and gloss. Generally, these properties are achieved by adding an opacifying pigment such as titanium dioxide to the paper furnish for the decor sheet to provide a controlled level of opacity and saturating the decor sheet with appropriate amounts of resin to insure that adequate resin is available on the surface of the sheet to provide durability.

The addition of pigment and resin to the decor sheet have opposing effects on the opacity of the sheet. Reducing the resin concentration in the decor sheet tends to improve the hiding power, but lowers the gloss and surface durability. Increasing the resin concentration has the effect of lowering the hiding power of the decor sheet while increasing gloss and surface durability. Thus, the addition of higher amounts of resin to improve durability may require that additional pigment such as $TiO_2$ be incorporated in the sheet to compensate for loss of opacity. Such a sheet does not efficiently utilize either $TiO_2$ or saturating resin. The large amounts of resin and $TiO_2$ employed in such decorative sheets are unattractive from an economic point of view particularly with respect to $TiO_2$ which is very expensive.

Thus, it would be desirable to provide an economical decor sheet which employs reduced amounts of both resin and $TiO_2$ and which exhibits good hiding power without sacrificing desirable surface durability properties and gloss to decorative laminates. The present invention provides such a decor sheet.

SUMMARY OF THE INVENTION

A principal object of the invention is to provide a decor sheet having high opacity at either reduced filler ($TiO_2$) level or at reduced basis weight.

Another object of this invention is to provide a decor sheet having a resin-starved bottom surface and a resin-rich top surface. Methods for providing such a gradient resin capacity include use of internal sizing and the use of different types of furnishes and papermaking techniques in the bottom and top portions of the decor sheet. For example, in a preferred method, a sizing agent is applied to the bottom surface of the decor sheet to prevent or reduce absorption of the resin into the fiber network of the sheet.

It has now been discovered that decor sheets having enhanced opacity can be obtained by internally or surface sizing the decor sheet. The decor sheet may be uniformly sized in one embodiment, but in another embodiment, by sizing one surface of the decor sheet, when the sheet is saturated with the laminating resins, a resin gradient in the thickness or Z direction of the decor sheet is obtained wherein the amount of resin in the surface-sized portion of the decor sheet is less than the amount of resin in the unsized portion of the sheet. By placing the unsized surface at the top of the laminate and the sized surface adjacent the core, surface durability and good hiding power are achieved. By uniformly internally sizing the sheet overall resin reduction and enhanced opacity are achieved.

The decor sheet of the invention not only provides the desired opacity and surface properties, but requires less opacifying agent and resin than conventional decor sheets. For example, the amount of an opacifying agent, such as $TiO_2$, may be reduced by 30 to 35% or more in some cases. The resin-starved decor sheet and, more particularly the resin starved bottom layer of a dual layer decor sheet contains entrained air in the fiber matrix. The difference in the index of refraction of the resin and fiber as compared to the air results in increased reflectance and increased opacity. In a dual layer decor sheet, the resin-rich top layer of the sheet provides the gloss and durable surface properties desired in a decorative laminate.

The decor sheet of the invention is prepared by internally sizing or surface sizing the sheet such that its capacity for the laminating resin is reduced.

In one embodiment of the invention, a dual layer decor sheet may be formed from two intimately associated fibrous mats or strata to provide a dual layer sheet. Typically, the dual layer decor sheet is prepared by depositing a layer of fibrous furnish containing an internal sizing agent on a paper machine forming wire, and while the layer is in a wet state and still supported on the forming wire, depositing a second layer of fibrous furnish which is free of size to the base layer from a second headbox. The top layer may contain the same fibrous materials as the base layer but for the sizing agent.

The Decor sheet may be formed in a conventional manner from a single furnish and the bottom surface of the decor sheet may be sized without sizing the top surface so that the bottom portion of the sheet absorbs less resin than the top portion. While in the preferred aspect, the top of the decor sheet contains no sizing agent, it is within the present invention for the top layer to contain a sizing agent in an amount less than the amount of sizing agent in the bottom layer or to contain a less effective sizing agent in terms of reducing resin capacity than is used in the bottom layer. Those skilled in the art will also appreciate that the sized and unsized furnish may be placed on the wire in any order.

Thus, it is an object of the present invention to provide a decor sheet for use in a decorative laminate wherein the decor sheet is sized to reduce its resin capacity and is preferably differentially sized so as to provide more resin at one surface (e.g., the top) of the sheet where surface durability is required and less resin adjacent the core where opacity is desired to hide the core sheets.

Another object of the present invention is to provide a decor sheet containing a reduced amount of opacifying agent such as titanium dioxide.

Still another objective of the present invention is to provide a decorative laminate containing a decor sheet in accordance with the invention.

Another aspect of the present invention provides a decorative laminate comprising a resin-impregnated decor sheet wherein the decor sheet is treated with a sizing agent to reduce its resin capacity. More particularly, a decorative laminate is provided in which at least one surface of the decor sheet is treated with a sizing agent such that the decor sheet exhibits a resin gradient in the thickness direction of said decor sheet to provide a resin-rich top layer and a resin-starved lower layer.

Definitions

The term "dual layer decor sheet" as used herein means a decor sheet having two layers wherein the top layer and the bottom layer of the sheet are sized differently, for example, one layer may be prepared from a furnish containing more size than the other layer or from a furnish sized differently so that it absorbs less saturating resin than the other.

By "desired level of opacity," is meant that the opacity of the decor sheet is such that the brown color of the kraft core sheets is not seen through the resin-containing decor sheet of the invention.

"Top surface" or "top portion" is the surface or portion of the decor sheet furthest removed from the core sheets in a decorative laminate. This is the surface facing the top of the laminate.

"Bottom surface" or "bottom portion" is the surface or portion of the decor sheet adjacent the core sheets in a decorative laminate. This surface is not seen in a laminate.

DETAILED DESCRIPTION OF THE INVENTION

As stated above, the purpose of this invention is to improve the hiding power of the decor sheet and, in the preferred embodiment, to improve hiding power while also providing sufficient surface resin to insure good gloss and surface durability properties. In accordance with the present invention, the decor sheet can be designed to provide reduced resin capacity or a graduated resin concentration, which is higher at the top of the sheet than at the bottom of the sheet. In a dual layer decor sheet, the top surface is designed to hold sufficient resin to insure both good gloss and the desired surface properties while the bottom surface is designed to reduce resin absorption and provide better opacity.

The sizing agents which may be employed in the present invention must be capable of repelling or reducing the laminating resin uptake so as to retain entrained air within the treated portion of the sheet. Useful sizing agents include alkenyl succinic anhydride (ASA), alkylketene dimer (AKD), dispersed rosin, aluminum stearate, copolyester, fluorochemicals, fortified rosin, gelatin, latexes, polyurethane, rosin soap, silanes, silicates, stearato chromic chloride, styrene maletic anhydride (SMA), wax emulsions, etc. The preferred sizing agent is alkenyl succinic anhydride (ASA), alkylketene dimer (AKD), or dispersed rosin. Particularly preferred is dispersed rosin such as that sold under the Trade Name Stafor available from Hercules. While the application makes reference to the above sizing agents, those skilled in the art will appreciate that other sizing agents may be used in place of or in combination with the preferred sizing agents provided that they prevent complete infiltration of the decor sheet by the laminating resin.

The fibers used in the decor sheet of the invention are most typically cellulosic fibers and preferably a bleached kraft pulp. The pulp may consist of hardwoods or softwoods or a mixture of hardwood and softwoods. Higher alpha cellulose such as cotton may be added to enhance such characteristics as postformability. In addition to cellulose fibers, a wide variety of other fibers may be used alone or in combination with the cellulose fibers. For example, the decor sheet may be formed from cellulose fibers, synthetic fibers such as nylon, rayon, acrylic, olefinic, etc. or inorganic fibers such as glass.

In accordance with this invention, reductions of up to 50% in the amount of resin in the decor sheet may be provided. However, in order to maintain the other physical properties of the sheet, such as strength, durability and hardness, the resin uptake generally should not be reduced more than about 20%. The amount of sizing agent can be controlled to adjust the resin uptake to the desired level. For example, while a conventional decor sheet may take up about 45 to 70% of resin based on the total weight of the resin impregnated sheet, the decor sheets of the present invention will take up about 30 to 65% and in many cases less than about 45% resin. In a dual layer decor sheet, the top portion of the sheet may take up 45 to 70% resin and the bottom portion may take up about 35 to 65% resin with the top portion of the sheet containing at least 10% more resin than the bottom portion (i.e., [resin top - resin bottom] ÷ resin bottom).

The resin pick up will depend upon the basis weight of the sheet, filler levels, amount of sizing, nature of the fibers, etc. The amount of sizing agent necessary to provide this effect will vary depending on the nature of the size, the laminating resin used, and the fibers and whether the size is a surface size or internal size. Conventional surface sizes are generally applied to the bottom surface of the sheet in an amount of about 0.1 to 3% based on the dry weight of the sheet. Using an internal size, the internal size is generally incorporated into the decor sheet as a whole or in the bottom fibrous layer of a dual layer sheet in an amount of about 0.1 to 3%.

Opacifying pigments useful in the present invention are those commonly used in the papermaking industry to provide opacity in decor sheets. While titanium dioxide is the preferred opacifying agent, those skilled in the art will appreciate that other opacifying pigments such as zinc oxide, carbon black, iron oxide, cobalt oxide, chromium, chromium oxide, clay, amorphous silia, etc. may be used in place of or in combination with titanium dioxide. Typically, the amount of opacifying agent found to be useful in the invention is in the range of about 5 to 50% and preferably about 10 to 40% based on the weight of the sheet. Opacifying extenders like silica, alumina, and clay can be used with the furnish.

Additives conventionally used in decor sheets such as alum, alkali and the like may be added in conventional amounts to control certain characteristics such as postforming. Wet strength resins may be added for wet strength characteristics. A retention aide may also be added if desired.

Selection of the resin useful in the present invention will largely be governed by the intended end use of the finished decorative laminate. Amnioplasts such as melamine formaldehyde resin, acrylics such as polyacrylonitrile, polyester resins such as diallylphthalate, phenolic resins, polyurethanes, and epoxy resins may be used.

The decor sheets of the present invention can be employed in conjunction with other sheets conventionally used in decorative laminates. For example, the decor sheet of the present invention may be bonded to a plurality of fibrous cellulosic core or body sheets which, typically, are unbleached kraft paper sheets impregnated with a thermosetting resin such as a phenol-formaldehyde resin. In addition, the laminate may be overlayed with a transparent overlay sheet which is, typically, a sheet of cellulose impregnated with melamine-formaldehyde resin. Particles of silica or other abrasion resistant particles may be incorporated into the overlay sheet to give added abrasion resistance to the sheet. In order for the overlay to be clear, the fiber, impregnating resin and the abrasion resistant particles must have an index of refraction close to each other.

Decorative laminates in accordance with the present invention may be provided with glossy, matted or satin finishes in a known manner. Furthermore, properties such as flame retardant characteristics, abrasion resistance can be introduced using technology which is readily available and known in the art.

The present invention is further illustrated by the following nonlimiting example.

EXAMPLE 1

(Control)

A single layer decor sheet having a basis weight of 62.2 grams per square meter was manufactured on a Fourdrinier paper machine forming wire from a cellulosic furnish to provide a decor sheet containing 21.0 grams $TiO_2$ per square meter.

EXAMPLE 2

A dual layer decor sheet consisting of a primary layer (67%) and a secondary layer (33%) was manufactured using a first furnish similar to that used in Example 1. The furnish for the top layer was supplied from a second headbox and a second furnish, which differed from the first furnish in that the second furnish additionally contained 3% Stafor dispersed rosin internal size, was supplied from a primary headbox to provide the bottom layer. The finished dual layer decor sheet contained a total of 14.8 grams $TiO_2$ per square meter and 53.9% resin. The results are shown in Table I.

TABLE I

| Example | BW g/m² | Resin Amount % | TiO₂, g/m² | Ash % | Laminate Reflect. | TiO₂ Scat. Coef., lc²/g |
|---|---|---|---|---|---|---|
| 1 (Control) | 62.2 | 60.5 | 21.0 | 33.9 | 76.0 | 1818 |
| 2 | 65.4 | 53.9 | 14.8 | 29.0 | 78.6 | 2587 |

The Examples show an 11% savings in the amount of resin used and a 42% improvement in the scattering coefficient for $TiO_2$ in the dual layer (Example 2) when compared to the single layer (Example 1-Control).

As illustrated in Table 1, the single layer decor sheet of Example 1 containing 21 g/m² $TiO_2$ had a laminate reflectance of 76. The dual layer decor sheet of Example 2 exhibited a comparable laminate reflectance but contained only 14.8 g/m $TiO_2$. This represents a 29.5% savings in titanium dioxide to achieve the same hiding power as the control single ply sheet.

Having described the invention in detail and by references to the preferred embodiments thereof, it will be apparent that modifications and variations are possible without departing from the scope of the invention defined in the appended claims.

What is claimed is:

1. A decorative laminate comprising a laminating resin-impregnated decor sheet and a plurality of laminating resin-impregnated core sheets, said decor sheet being treated with a sizing agent such that said sheet is only partially impregnated with said laminating resin, said sizing agent being a sizing agent which is capable of substantially reducing the amount of laminating resin absorbed by said decor sheet.

2. The decorative laminate of claim 1 wherein said decor sheet further contains an agent selected from the group consisting of an opacifying agent, inorganic pigments and organic colorants.

3. The decorative laminate of claim 1 wherein said resin-impregnated decor sheet includes entrained air.

4. The decor sheet for use in a decorative laminate comprising a fibrous mat having a top portion and a bottom portion in the thickness direction of the mat, wherein the bottom portion of said fibrous mat includes a sizing agent and the top portion of said fibrous mat is essentially free of said sizing agent such that said top portion absorbs at least 10% more laminating resin per unit volume than said bottom portion when the decor sheet is saturated with a laminating resin.

5. The decor sheet of claim 4, wherein said fibrous mat comprises cellulosic fibers.

6. The decor sheet of claim 4, wherein said sizing agent is selected from the group consisting of alkylketene dimer (AKD), alkenyl succinic anhydride (ASA), and dispersed rosin.

7. The decor sheet of claim 6, wherein said sizing agent is dispersed rosin.

8. The decor sheet of claim 4, wherein said decor sheet further comprises about 5 to 50% based on the weight of said fiber of an agent selected from the group consisting of an opacifying agent, inorganic pigments and organic colorants.

9. The decor sheet of claim 8, wherein said decor sheet contains titanium dioxide.

10. The decor sheet of claim 4, wherein said bottom portion is treated with a surface sizing agent.

11. The decor sheet of claim 4, wherein the bottom portion of said fibrous mat is prepared from an internally sized fibrous furnish.

12. The decor sheet of claim 11, comprising a first layer of an internally sized fibrous mat prepared from a cellulosic fibrous furnish containing about 0.5 to 3% of a sizing agent; a second layer of a fibrous mat prepared from a cellulosic fibrous furnish essentially free of sizing agent; and said sheet containing about 5 to 50% opacifying agent.

13. A decorative laminate comprising a laminating resin-impregnated decor sheet and a plurality of laminating resin-impregnated core sneers, wherein said decor sheet comprises a fibrous mat having a top portion and a bottom portion in the thickness direction of the sheet, wherein the bottom portion of said fibrous mat includes a sizing agent and the top portion of said fibrous mat is essentially free of said sizing agent such that said top portion absorbs at least 10% more laminating resin per unit volume than the bottom portion when the decor sheet is impregnated with said resin.

14. The decorative laminate of claim 13 wherein said opacifying agent is titanium dioxide.

15. The decorative laminate of claim 13 wherein said decor sheet comprises a first strata of an internally sized fibrous mat prepared from a fibrous furnish containing about 0.5 to 3% sizing agent; and a second strata of a fibrous mat prepared from a cellulosic fibrous furnish essentially free of sizing agent.

16. The decorative laminate of claim 13 wherein the bottom portion of said decor sheet is surface sized.

17. The decorative laminate of claim 13 wherein said sizing agent is selected from the group consisting of alkylketene dimer (AKD), alkenyl succinic anhydride (ASA), and dispersed rosin.

18. The decorative laminate of claim 17 wherein said sizing agent is dispersed rosin.

19. The decorative laminate of claim 12 wherein the bottom portion of the sheet contains 35 to 65% resin and the top portion contains 45 to 70% resin.

* * * * *

UNITED STATES PATENT AND TRADEMARK OFFICE
CERTIFICATE OF CORRECTION

PATENT NO. : 5,601,930
DATED : February 11, 1997
INVENTOR(S) : Mahendra Mehta et al.

It is certified that error appears in the above-indentified patent and that said Letters Patent is hereby corrected as shown below:

Col. 6, claim 4, line 27, "The" should be --A--.

Col. 6, claim 13, line 63, "sneers" should be --sheets--.

Signed and Sealed this

Fifteenth Day of April, 1997

Attest:

BRUCE LEHMAN

Attesting Officer       Commissioner of Patents and Trademarks